(12) United States Patent
Hwang et al.

(10) Patent No.: US 10,561,934 B2
(45) Date of Patent: Feb. 18, 2020

(54) GAMING SYSTEM AND GAMING METHOD

(71) Applicant: NATIONAL TAIWAN NORMAL UNIVERSITY, Taipei (TW)

(72) Inventors: Ming-Yueh Hwang, Taipei (TW); Jon-Chao Hong, Taipei (TW); Yu-Feng Wu, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 72 days.

(21) Appl. No.: 15/975,019

(22) Filed: May 9, 2018

(65) Prior Publication Data
US 2019/0060744 A1    Feb. 28, 2019

(30) Foreign Application Priority Data
Aug. 25, 2017    (TW) .............................. 106128876 A

(51) Int. Cl.
*A63F 13/218*        (2014.01)
*A63F 13/212*        (2014.01)
*A63F 13/428*        (2014.01)
*A63F 13/35*         (2014.01)
*A63B 24/00*         (2006.01)
(Continued)

(52) U.S. Cl.
CPC ........ *A63F 13/218* (2014.09); *A63B 24/0062* (2013.01); *A63F 13/212* (2014.09); *A63F 13/35* (2014.09); *A63F 13/428* (2014.09); *A63F 13/816* (2014.09); *A63F 13/847* (2014.09); *A63F 2300/5553* (2013.01)

(58) Field of Classification Search
CPC ...... A63F 13/218; A63F 13/212; A63F 13/35; A63F 13/428; A63F 2300/5553; A63F 13/816; A63F 13/847; A63B 24/0062

USPC ............................................................. 463/7
See application file for complete search history.

(56) References Cited

U.S. PATENT DOCUMENTS

| 8,231,506 B2 * | 7/2012 | Molyneux ............ A43B 1/0054 482/1 |
| 2012/0253485 A1 * | 10/2012 | Weast ...................... G06F 1/163 700/91 |

(Continued)

FOREIGN PATENT DOCUMENTS

| CN | 103861265 B | 11/2016 |
| TW | M506628 U | 8/2015 |

OTHER PUBLICATIONS

Taiwanese Search Report for Taiwanese Application No. 106128876, dated Jun. 14, 2018, with English translation.

*Primary Examiner* — Allen Chan
(74) *Attorney, Agent, or Firm* — Birch, Stewart, Kolasch & Birch, LLP

(57) ABSTRACT

A wearable device is configured to be worn by a first user, and to output pressure data indicating an amount of the pressure sensed thereby. An electronic device is communicatively connected to the wearable device for receiving the pressure data. In response to receipt of an initiating signal from a host device, the electronic device, continuously within a predetermined time period, accumulates a first number of exercise movements done by the first user based on the pressure data, receives data related to a second number of exercise movements done by a second user from the host device, and display a dynamic image indicating a relationship between the first number and the second number.

9 Claims, 5 Drawing Sheets

(51) Int. Cl.
*A63F 13/816* (2014.01)
*A63F 13/847* (2014.01)

(56) References Cited

U.S. PATENT DOCUMENTS

2014/0163704 A1* 6/2014 DePietro .............. A43B 3/0005
  700/91
2014/0244009 A1* 8/2014 Mestas ............... A63B 24/0062
  700/91
2018/0178064 A1* 6/2018 Nah ................... A63B 24/0062

* cited by examiner

GAMING SYSTEM AND GAMING METHOD

CROSS-REFERENCE TO RELATED APPLICATION

This application claims priority to Taiwanese Patent Application No. 106128876 filed on Aug. 25, 2017.

FIELD

The disclosure relates to a gaming system and a gaming method, more particularly to a gaming system and a gaming method using a communication network.

BACKGROUND

Exercise can maintain and enhance physical fitness and overall health and wellness of human beings. However, people nowadays often ignore the importance of exercise due to stress at work or school. It is worth working on the subject of encouraging people to exercise more often.

SUMMARY

Therefore, an object of the present disclosure is to provide a gaming system and a gaming method that may encourage people to exercise more often.

According to one aspect of the present disclosure, a gaming system includes a wearable device and an electronic device. The wearable device is configured to be worn by a first user, to sense pressure applied thereon, and to output pressure data indicating an amount of the pressure sensed thereby. The electronic device is configured to be communicatively connected to the wearable device for receiving the pressure data, and to communicate with a host device. The electronic device is programmed to, in response to receipt of an initiating signal from the host device and continuously within a predetermined time period, accumulate a first number of exercise movements done by the first user based on the pressure data, receive data related to a second number of exercise movements done by a second user from the host device, and display a dynamic image indicating a relationship between the first number and the second number according to the data received from the host device.

According to another aspect of the present disclosure, a gaming method is provided. The gaming method is to be implemented continuously by an electronic device within a predetermined time period upon receiving an initiating signal from a host device. The electronic device is communicatively connected to a wearable device that is to be worn by a first user to sense pressure applied thereon. The gaming method includes steps of:

receiving pressure data from the wearable device, the pressure data being generated and outputted by the wearable device and indicating an amount of the pressure sensed by the wearable device;

accumulating a first number of exercise movements done by the first user based on the pressure data;

receiving data related to a second number of exercise movements done by a second user from the host device; and displaying a dynamic image indicating a relationship between the first number and the second number according to the data received from the host device.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
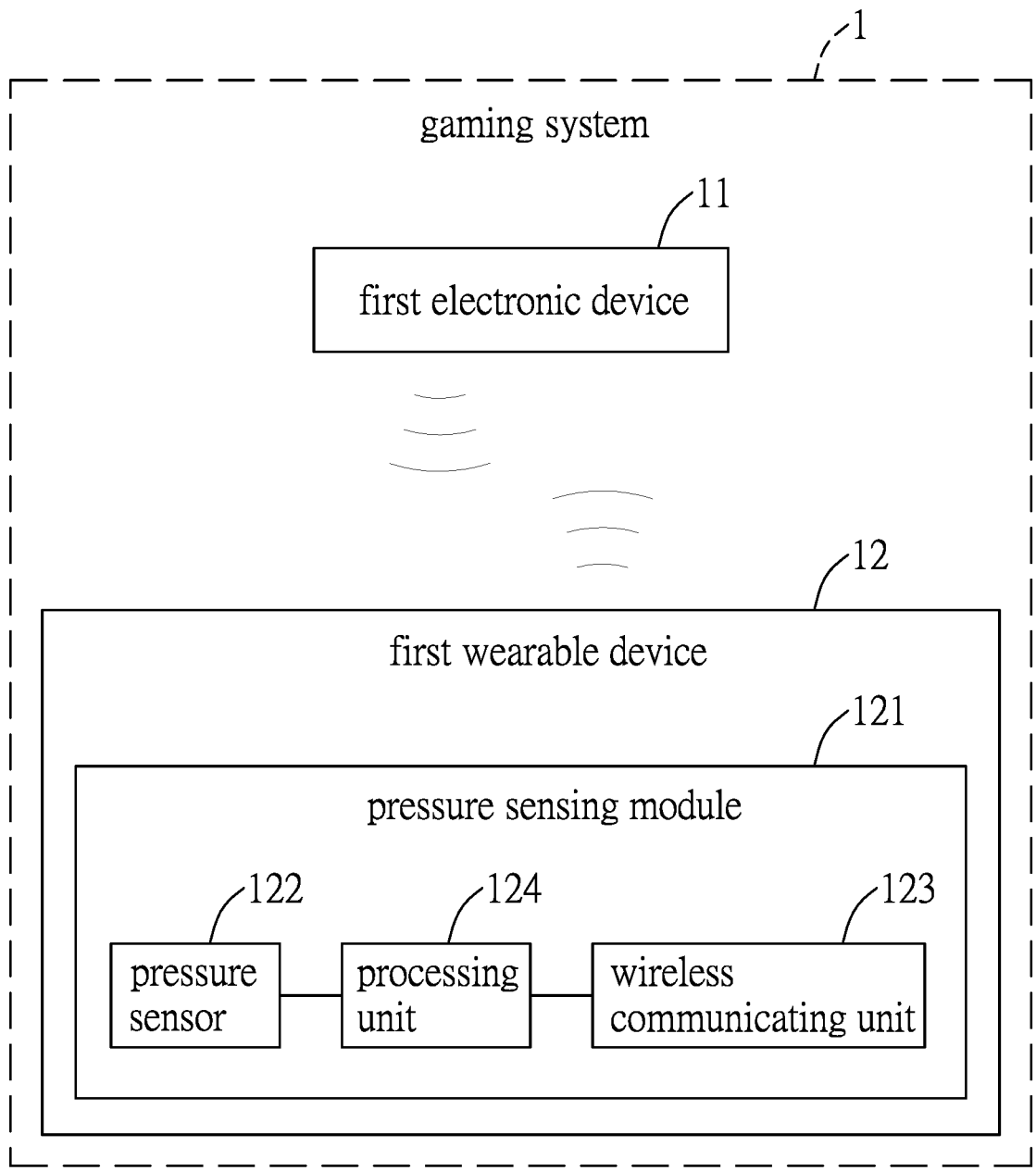
FIG. 1 is a schematic block diagram of a gaming system according to one embodiment of the present disclosure.
Figure 5:
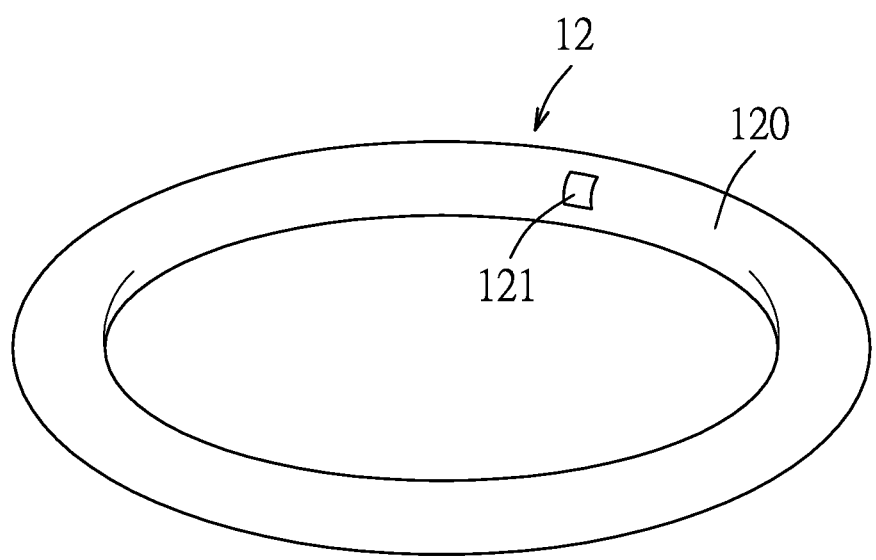
FIG. 5 is a schematic perspective view illustrating a wearable device of the gaming system according to one embodiment of this disclosure.

Referring to FIG. 1, a gaming system 1 according to an embodiment of this disclosure includes a first electronic device 11 and a first wearable device 12. The first wearable device 12 includes a band 120 (see FIG. 5) to be worn by a first user, and a pressure sensing module 121.

Figure 2:
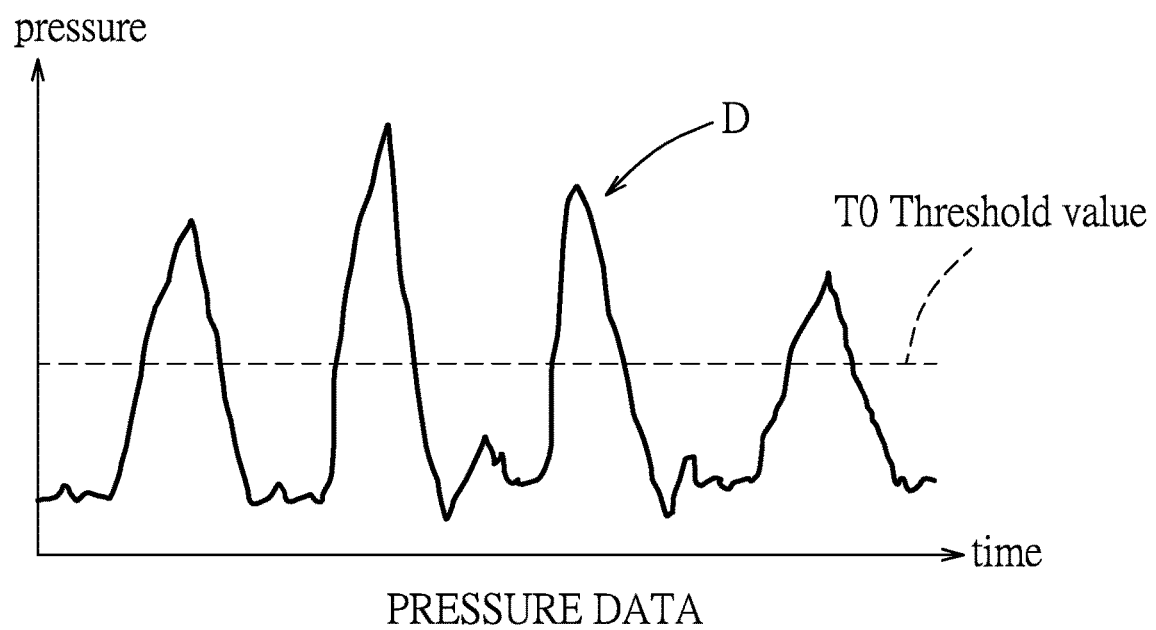
FIG. 2 is a diagram illustrating exemplary pressure data sensed by a first wearable device of the gaming system.

The pressure sensing module 121 is mounted on the band 120, and includes a pressure sensor 122, a wireless communicating unit 123 and a processing unit 124. Further referring to FIG. 2, the pressure sensor 122 is for sensing the pressure applied thereon and generating first pressure data (D) indicating an amount of the pressure sensed thereby. For example, the pressure sensor 122 is, but not limited to, a FlexiForce® ESS301 sensor manufacture by Tekscan™, Inc., or an FSR 402 sensor manufacture by Interlink Electronic.

The processing unit 124 is electrically connected to the pressure sensor 122 for receiving the first pressure data (D) therefrom. The term "processing unit" may refer to any device or portion of a device that processes electronic data from registers and/or memory to transform that electronic data into other electronic data. For example, the processing unit 124 is, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The wireless communicating unit 123 is electrically connected to the processing unit 124, and is controlled by the processing unit 124 to transmit the first pressure data (D) to the first electronic device 11. For example, the wireless communicating unit 123 is implemented by a Bluetooth communicating module, but the present disclosure is not limited to this example.

The band 120 can be worn on different body parts of the first user according to the exercise performed by the first user. For example, the band 120 is worn on a thigh of the first user when the first user is doing alternating squat jump, so that the pressure sensor 122 of the pressure sensing module 121 mounted on the band 120 can sense the pressure attributed to muscle contractions of the thigh. When the user is doing push-up, the band 120 is worn on an arm of the first user so that the pressure sensor 122 can sense the pressure attributed to muscle contractions of the arm. It should be noted that the present disclosure is not limited in this respect.

Figure 3:
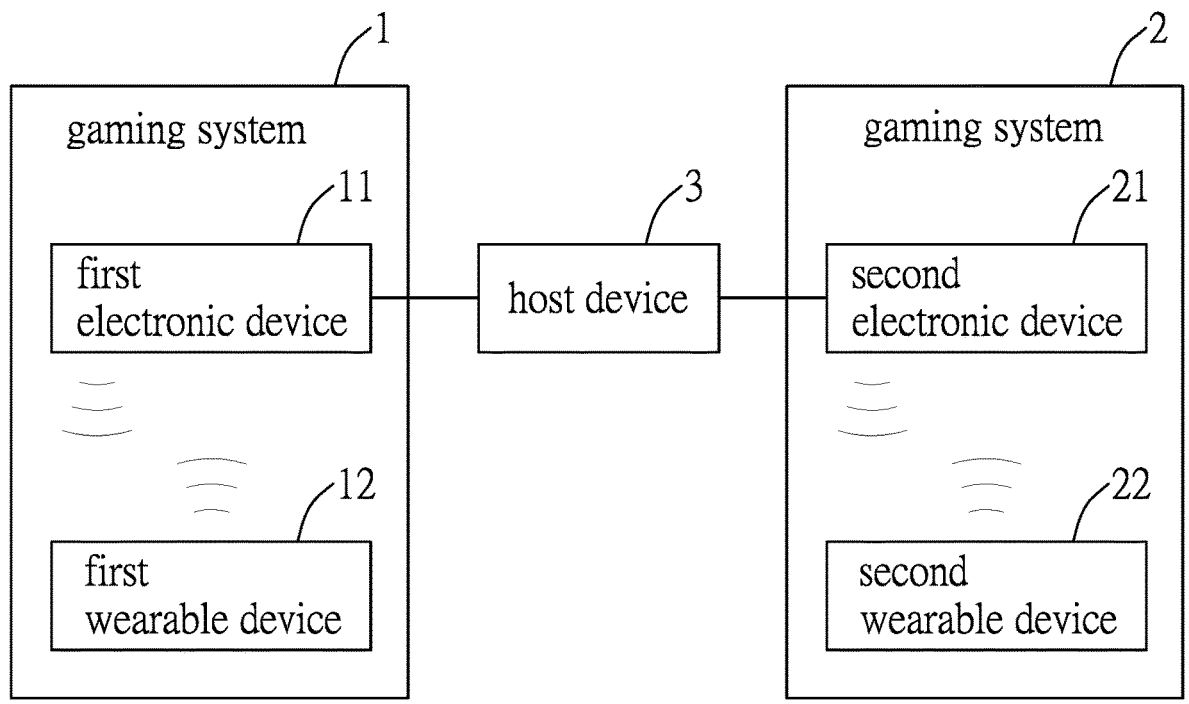
FIG. 3 is a schematic block diagram illustrating the gaming system of one embodiment communicatively connected to a host device and another gaming system.

Further referring to FIG. 3, the first electronic device 11 communicates with a host device 3 and another gaming system 2 via a communication network. In this embodiment, the communication network is the Internet or an intranet, and the host device 3 is a cloud server; however, the present disclosure is not limited in this aspect. The gaming system 2 is similar to the gaming system 1, and includes a second electronic device 21 and a second wearable device 22. Each of the first electronic device 11 and the second electronic device 21 may be a laptop, a netbook, a notebook, an ultrabook, a smartphone, a tablet, a personal digital assistant (PDA), an ultra mobile PC, a mobile phone or a desktop computer. In further implementations, each of the first electronic device 11 and the second electronic device 21 may be any other electronic device, such as a pen, a wallet, a watch, or an appliance that processes data. The second wearable device 22 is similar to the first wearable device 12, and is worn by a second user for sensing the pressure attributed to muscle contractions of the second user doing exercise, and for generating second pressure data indicating an amount of the pressure sensed thereby.

Figure 4:
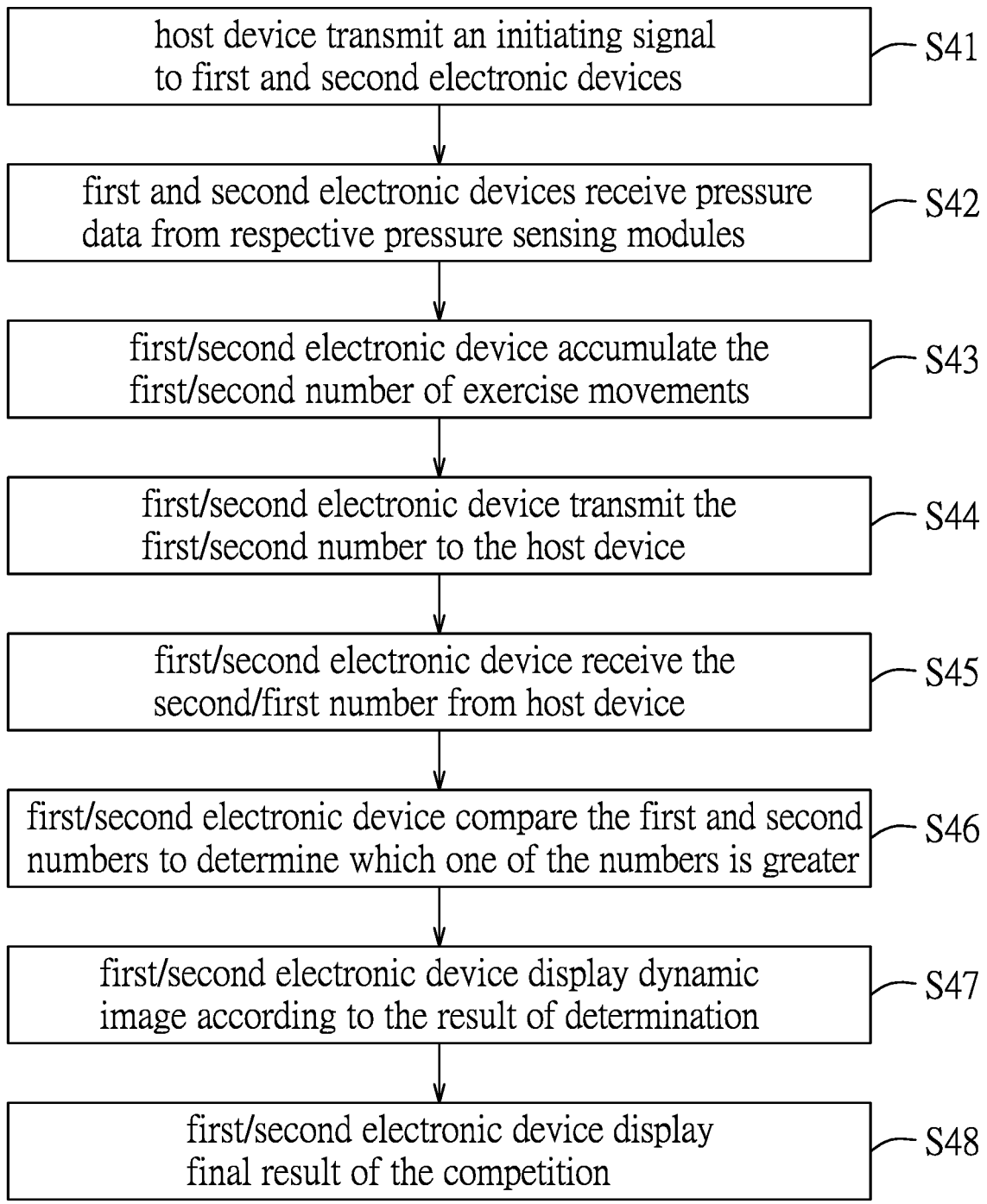
FIG. 4 is a flow chart of a gaming method according to one embodiment of present disclosure.

Referring to FIG. 4, a gaming method according to one embodiment of the present disclosure is to be implemented by the gaming system 1, the host device 3 and the gaming system 2.

In step S41, the host device 3 transmits an initiating signal to both the first electronic device 11 and the second electronic device 21. In this embodiment, the initiating signal is generated and outputted by the host device 3 upon receiving both a first confirmation signal from the first electronic device 11 and a second confirmation signal from the second electronic device 21. For example, when executing an application program for implementing the gaming method, the first electronic device 11 displays an interface having a start button on a touchscreen thereof, and transmits the first confirmation signal to the host device upon the first user who intends to join a game touching the start button. The second electronic device 21 may transmit the second confirmation signal to the host device 3 in a similar manner. Further, when executing the application program, each of the first electronic device 11 and the second electronic device 21 displays a message on the touchscreen thereof to instruct the first/second user how to wear the first/second wearable device 12, 22 and to do the same exercise. Upon receiving the initiating signal, the first electronic device 11, the host device 3 and the second electronic device 21 continuously perform the following steps within a predetermined time period (e.g., 1 minute), with the first user and the second user being competitors in an exercise competition. Note that since the first electronic device 11 and the second electronic device 21 may perform the same operations in the following steps, only the steps performed by the first electronic device 11 will be described in the following description for the sake of brevity.

In step S42, the first electronic device 11 receives, from the pressure sensing module 121 via the wireless communicating unit 123, the first pressure data indicating the amount of the pressure sensed by the pressure sensor 122.

In step S43, the first electronic device 11 accumulates a first number of exercise movements done by the first user based on the first pressure data (D). Specifically, the first electronic device 11 initially sets the first number to zero (at the beginning of the predetermined time period). Then, the first electronic device 11 adds one to the first number when determining that the amount of the pressure is greater than a threshold value (T0) for a predetermined time duration according to the first pressure data (D). Similarly, the second electronic device 21 accumulates a second number of exercise movements (i.e., the same exercise movement as the first user was doing) done by the second user in a similar manner. The predetermined time duration is, for example, 0.2 seconds and is not limited to this example.

The first electronic device 11 transmits the first number to the host device 3 in step S44, and then the host device 3 transmits the same to the second electronic device 21 in step S45. As for the second electronic device 21, the second electronic device 21 transmits the second number to the host device 3 in step S44, and then the first electronic device 11 receives the second number from the second electronic device 21 through the host device 3 in step S45. In some embodiments, the first user may compete with a virtual user, and the second number can be generated directly by the host device 3. In some embodiments, the first user may join the game with two or more different users, and the first electronic device 11 may receive a number of the exercise movements done by each of the different users and determine which one of the numbers is the greatest of all. The present disclosure is not limited to the number of users joining the game.

In step S46, the first electronic device 11 compares the first number and the second number to determine which one of the first number and the second number is greater.

In step S47, the first electronic device 11 and the second electronic device 21 both display a dynamic image according to the result of determination made in step S46.

After the predetermined time period has elapsed, steps S42 to S47 are ceased, and the flow proceeds to step S48. In step S48, the first electronic device 11 displays a final result of the competition between the first user and the second user. For example, the first electronic device 11 displays "WIN" when the first number is greater than the second number, displays "LOSE" when the first number is smaller than the second number, and displays "DRAW" when the first number is equal to the second number. Similarly, the second electronic device 21 displays "LOSE" when the first number is greater than the second number, displays "WIN" when the first number is smaller than the second number, and displays "DRAW" when the first number s equal to the second number.

It should be noted that, although the steps in the flow chart of FIG. 4 are shown in a particular order, the order of these steps can be modified. Thus, the illustrated embodiments can be performed in a different order, and some steps may be performed in parallel.

Note that, the first and second electronic devices 11, 21 display the same dynamic image in step S47, and only the dynamic image displayed on the first electronic device 11 will be described in the following examples.

For example, in step S47, the first electronic device 11 displays the dynamic image including a first avatar representing the first user, and a second avatar representing the second user. The first avatar and the second avatar are, e.g., two virtual animals. In one example, the first, avatar and the second avatar both move along a predetermined path, such as a runway, simulating the two virtual animals running a race. The first avatar moves faster than the second avatar when the first number is greater than the second number, and slower than the second avatar when the first number is smaller than the second number. By this way, the first user and the second user can be made aware of the status of the game therebetween, and the relation between the first number and the second number (i.e., which one of the first and second numbers is greater) according to the dynamic image displayed on the first and second electronic devices 11, 21. In some embodiments, the first and second avatars may be of other types, such as cartoon characters, etc.

In another example, the first avatar has reciprocating motion in predetermined opposite directions, e.g., up and down directions, and the second avatar also has reciprocating motion in the predetermined opposite directions, simulating rope skipping of the two virtual animals. The reciprocating motion of the first avatar is faster than that of the second avatar when the first number is greater than the second number, and is slower than that of the second avatar when the first number is smaller than the second number. By this way, the first user and the second user can be made aware of the status of the game and the relation between the first and second numbers according to the dynamic image displayed on the first and second electronic devices 11, 21.

In yet another example, the first electronic device 11 displays the dynamic image further including a virtual object connected between the first and second avatars. In this example, the dynamic image simulates the first and second avatars having tug of war and the virtual object serves as a rope between the first and second avatars. The virtual object moves in a first direction toward the first avatar when the first number is greater than the second number, and moves in a second direction opposite to the first direction toward the second avatar when the second number is greater than the first number.

Figure 6:
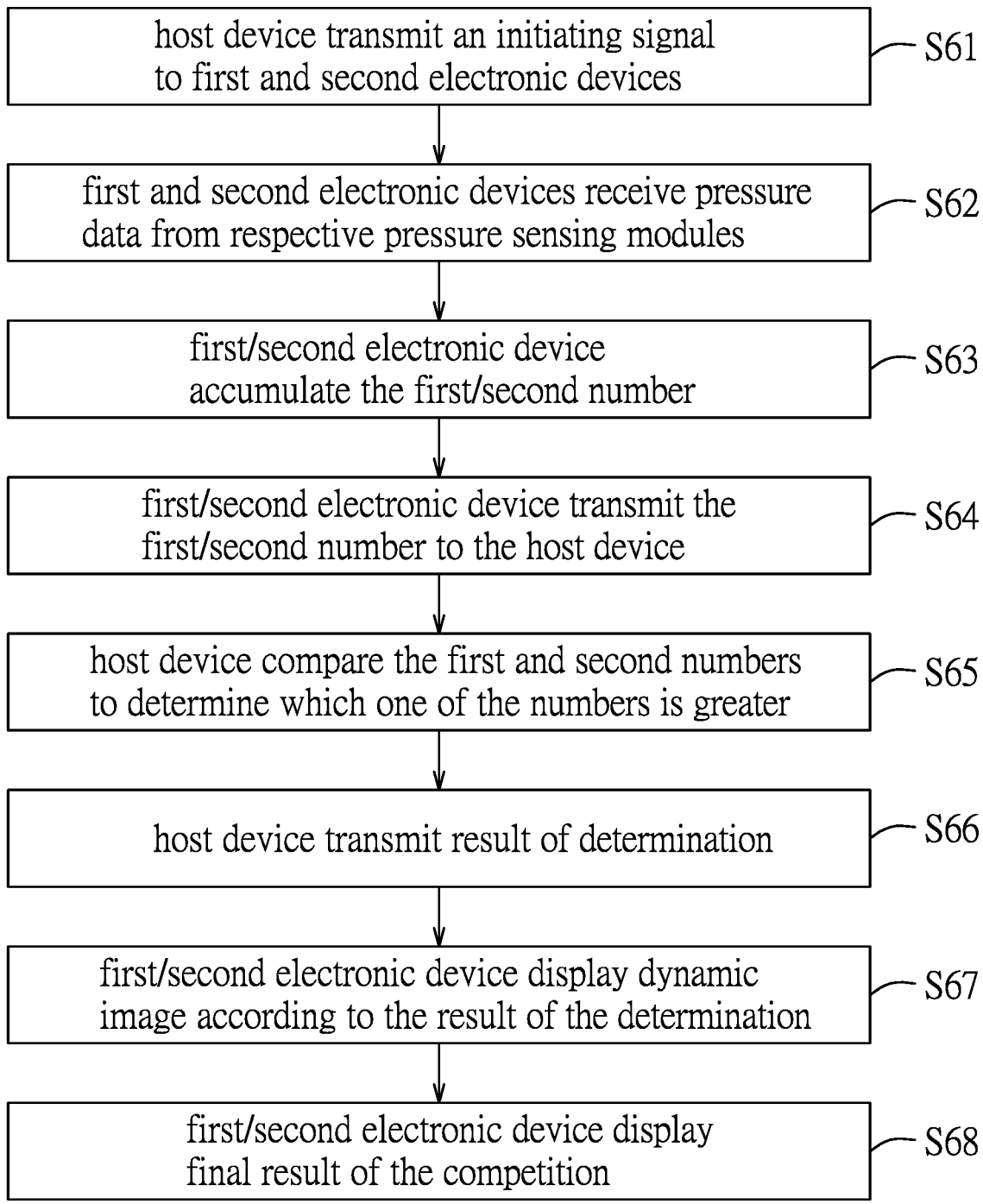
FIG. 6 is a flow chart of a gaming method according to another embodiment of the present disclosure.

Referring to FIG. 6, another embodiment of the method according to the present disclosure is shown. In this embodiment, steps S61-S64, S67 and S68 are identical to steps S41-S44, S47 and S48 of FIG. 4, respectively, and the differences between the method of FIG. 6 and the method of FIG. 4 are described in the following.

In step S65, the host device 3 compares the first number and the second number to determine which one of the first number and the second number is greater without transmitting the second and first numbers to the first and second electronic devices 11, 21, respectively. In step S66, the host device 3 transmits the result of determination to the first electronic device 11 and the second electronic device 21. Note that the host device 3 may receive three or more numbers of exercise movements respectively done by three or more users, and the present disclosure is not limited in this respect.

To sum up, the first/second wearable device 12, 22 transmits the first/second pressure data related to first/second number of exercise movements done by the first/second user, and the first/second electronic device 11, 21 and/or the host device 3 are capable of determining which one of the first and second numbers is greater. Accordingly, the first/second electronic device 11, 21 may display the dynamic image reflecting progress of the competition between the first and second users in real-time according to the result of determination. By this way, the first and second users may be encouraged to exercise more in order to win the game.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A gaming system comprising:
    a wearable device configured to be worn by a first user, to sense pressure applied thereon, and to output pressure data indicating an amount of the pressure sensed thereby; and
    an electronic device configured to be communicatively connected to said wearable device for receiving the pressure data, and to communicate with a host device;
    wherein, said electronic device is programmed to, upon receiving an initiating signal from the host device and continuously within a predetermined time period, accumulate a first number of exercise movements done by the first user based on the pressure data, receive data related to a second number of exercise movements done by a second user from the host device, and display a dynamic image indicating a relationship between the first number and the second number according to the data received from the host device, the dynamic image including a first avatar that represents the first user and that has reciprocating motion in predetermined opposite directions, and a second avatar that represents the second user and that has reciprocating motion in the predetermined opposite directions, and
    wherein the reciprocating motion of the first avatar is faster than that of the second avatar when the first number is greater than the second number, and is slower than that of the second avatar when the first number is smaller than the second number.

2. The gaming system as claimed in claim 1, wherein said electronic device is further programmed to, continuously within the predetermined time period, receive the second number as the data from the host device, compare the first number and the second number to determine which one of the first number and the second number is greater, and to display the dynamic image according to result of determination.

3. The gaming system as claimed in claim 1, wherein said electronic device is further programmed to, continuously within the predetermined time period, transmit the first number to the host device so that the host device compares the first number and the second number to determine which one of the first number and the second number is greater, receive result of determination as the data from the host device, and display the dynamic image according to the result of determination.

4. The gaming system as claimed in claim 1, wherein the first number is set to zero at the beginning of the predetermined time period, and said electronic device is programmed to add one to the first number when determining that the amount of the pressure is greater than a threshold value for a predetermined time duration according to the pressure data.

5. The gaming system as claimed in claim 1, wherein said wearable device includes:
    a band to be worn by the first user; and
    a pressure sensing module mounted on said band, and including
    a pressure sensor for sensing the pressure applied thereon and generating the pressure data,
    a processing unit that is electrically connected to said pressure sensor for receiving the pressure data therefrom, and a wireless communicating unit that is electrically connected to said processing unit and that is controlled by said processing unit to transmit the pressure data to said electronic device.

6. A gaming method to be implemented continuously by an electronic device within a predetermined time period upon receiving an initiating signal from a host device, the electronic device being communicatively connected to a wearable device that is to be worn by a first user to sense pressure applied thereon, the method comprising steps of:
receiving pressure data from the wearable device, the pressure data being generated and outputted by the wearable device and indicating an amount of the pressure sensed by the wearable device;
accumulating a first number of exercise movements done by the first user based on the pressure data;
receiving data related to a second number of exercise movements done by a second user from the host device; and
displaying a dynamic image indicating a relationship between the first number and the second number according to the data received from the host device, the dynamic image including a first avatar that represents the first user and that has reciprocating motion in predetermined opposite directions, and a second avatar that represents the second user and that has reciprocating motion in the predetermined opposite directions,
wherein the reciprocating motion of the first avatar is faster than that of the second avatar when the first number is greater than the second number, and is slower than that of the second avatar when the first number is smaller than the second number.

7. The gaming method as claimed in claim 6, wherein:
the step of receiving data is to receive the second number as the data from the host device;
the method further comprises a step of comparing the first number and the second number to determine which one of the first number and the second number is greater; and
the step of displaying a dynamic image is to display the dynamic image according to result of determination.

8. The gaming method as claimed in claim 6, further comprising a step of:
transmitting the first number to the host device so that the host device compares the first number and the second number to determine which one of the first number and the second number is greater;
wherein the step of receiving data is to receive result of determination as the data from the host device; and
the step of displaying a dynamic image is to display the dynamic image according to the result of determination.

9. The gaming method as claimed in claim 6, wherein the step of accumulating a first number of exercise movements includes:
setting the first number to zero at the beginning of the predetermined time period; and
adding one to the first number when determining that the amount of the pressure is greater than a threshold value for a predetermined time duration according to the pressure data.

* * * * *